US008095287B2

(12) United States Patent
Beechie et al.

(10) Patent No.: US 8,095,287 B2
(45) Date of Patent: Jan. 10, 2012

(54) METHODS AND SYSTEMS FOR CONTROLLING AN AXLE DISCONNECT DEVICE FOR AN ALL-WHEEL DRIVE VEHICLE

(75) Inventors: Brian E. Beechie, Armada, MI (US); Daniel L. Brown, Ortonville, MI (US); Donald R. Hughes, Auburn Hills, MI (US); Charles Bienenstein, Chesterfield, MI (US); James C. Savage, Lake Orion, MI (US); Mark C. Azzaretti, Shelby Township, MI (US); Donald F. Schmanski, Howell, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 1165 days.

(21) Appl. No.: 11/847,453

(22) Filed: Aug. 30, 2007

(65) Prior Publication Data
US 2009/0057047 A1 Mar. 5, 2009

(51) Int. Cl.
*B60K 17/354* (2006.01)
(52) U.S. Cl. .................. 701/65; 701/51; 701/69; 701/89
(58) Field of Classification Search .................... 701/36, 701/37, 51, 52, 53, 65, 66, 69, 89; 180/233, 180/247, 248, 249; 192/69.4–69.42
See application file for complete search history.

(56) References Cited

U.S. PATENT DOCUMENTS

| 4,607,562 | A * | 8/1986 | LeBlanc ................... 89/40.03 |
| 5,980,415 | A * | 11/1999 | Showalter ................... 475/213 |
| 6,295,886 | B1 * | 10/2001 | Russell ................... 74/473.18 |
| 6,549,840 | B1 * | 4/2003 | Mikami et al. ................... 701/69 |
| 2004/0020700 | A1 * | 2/2004 | Watson et al. ................... 180/247 |

FOREIGN PATENT DOCUMENTS
JP 61257325 A * 11/1986
* cited by examiner

*Primary Examiner* — Khoi Tran
*Assistant Examiner* — Spencer Patton
(74) *Attorney, Agent, or Firm* — Ralph E. Smith

(57) ABSTRACT

Methods and systems are described to automatically lock and unlock a front axle disconnect mechanism in an all-wheel drive (AWD) system responsive to driving conditions to reduce parasitic losses and increase fuel efficiency. A control algorithm is described which automatically determines whether the front axle disconnect mechanism should lock or unlock responsive to various sensor readings throughout the vehicle. The sensor readings relate to the driving conditions. Advantageously, the present disclosure automatically decides the best mode for optimum fuel economy while safely responding to driving conditions, and therefore removes the requirement for a driver to select the operating mode.

11 Claims, 3 Drawing Sheets

---

METHODS AND SYSTEMS FOR CONTROLLING AN AXLE DISCONNECT DEVICE FOR AN ALL-WHEEL DRIVE VEHICLE

FIELD OF THE DISCLOSURE

The present disclosure relates generally to all-wheel drive vehicles. More particularly, the present disclosure relates to methods and systems for automatically controlling a front axle disconnect (FAD) device responsive to various driving conditions in an all-wheel drive capable vehicle.

BACKGROUND OF THE DISCLOSURE

All-wheel drive (AWD) capable vehicles are capable of operating in four wheel (4W) drive and two wheel (2W) drive. Typically, AWD-capable vehicles include a transfer case, a rear drive shaft, and a front drive shaft. The transfer case is configured to divide power between the rear and front drive shafts when the vehicle is operating in 4W drive. Additionally, AWD-capable vehicles also can include a locking device, such as a locking hub or the like, to engage and disengage front wheels and a front drive axle. Conventionally, AWD-capable vehicles include a switch through which a driver can manually select 4W or 2W based on the driving conditions. Additionally, most AWD-capable vehicles typically engage 2W drive through the transfer case only, i.e. by sending power only to the rear drive shaft. These vehicles leave the front axle locked when entering into 2W drive leading to parasitic losses and decreased fuel efficiency.

BRIEF SUMMARY OF THE DISCLOSURE

In various exemplary embodiments, the present disclosure provides methods and a system to automatically lock and unlock a front axle disconnect mechanism in an AWD system to reduce parasitic losses and increase fuel efficiency. The present disclosure includes a control algorithm which automatically determines whether the FAD should lock or unlock responsive to various sensor readings throughout the vehicle. The sensor readings relate to the driving conditions. Advantageously, the present disclosure automatically decides the best mode for optimum fuel economy while safely responding to driving conditions, and therefore removes the requirement for a driver to select the operating mode.

In an exemplary embodiment of the present disclosure, a front axle lock and unlock method for an all-wheel drive vehicle includes determining driving conditions responsive to readings from one or more sensors, checking whether the driving conditions require all-wheel drive, actuating a front axle disconnect responsive to whether all-wheel drive is required, monitoring driving speed over time, unlocking the front axle disconnect responsive to the driving speed over time, and repeating the determining, checking, actuating, monitoring, and unlocking steps. Optionally, the front axle lock and unlock method further includes checking the number of actuations of the front axle disconnect since key on, and locking the front axle disconnect until a next cycle if the number of actuations exceeds a threshold. The driving conditions include low outside temperature, rainy conditions, autostick mode, electronic stability program events, electronic stability program off, vehicle on inclined road surface at a low vehicle speed, and combinations thereof. The checking step can include reading ambient temperature from a sensor and comparing to a threshold, reading windshield wiper sense and determining if windshield wipers have been actuated a minimum number of cycles within a predetermined time period, reading autostick sense and determining if a shifter is in autostick mode, reading an electronic stability program actuation signal and determining if any electronic stability program events have occurred within a predetermined time period, reading an electronic stability program switch signal and determining if an electronic stability program switch is turned off, and reading a G-sensor and vehicle speed sensor and determining if the vehicle is on an inclined road surface at a low vehicle speed.

In another exemplary embodiment of the present disclosure, a control module configured to automatically lock and unlock a front axle disconnect mechanism for an all-wheel drive vehicle responsive to driving conditions includes input and output interfaces connected to a front axle disconnect mechanism and one or more sensors distributed throughout the all-wheel drive vehicle, and a processor connected to the input and output interfaces and memory. The processor is configured to determine driving conditions responsive to readings received from the input and output interfaces from the one or more sensors, monitor driving conditions to determine whether all-wheel drive is required, and actuate the front axle disconnect mechanism to lock and unlock a front axle responsive to whether all-wheel drive is required based on the driving conditions. Optionally, the processor is further configured to track the number of front axle disconnect mechanism actuations per key cycle, and lock the front axle disconnect mechanism until a next key cycle if the number of actuations exceeds a threshold. The driving conditions requiring all-wheel drive can include low outside temperature, rainy conditions, autostick mode, electronic stability program events, electronic stability program off, vehicle on an incline at low vehicle speeds, and combinations thereof. The processor is further configured to read ambient temperature from a temperature sensor of the one or more sensors and compare to a temperature threshold, read windshield wiper sense and determine if windshield wipers have been actuated within a predetermined time period, read autostick sense and determine if a shifter is in autostick mode, read an electronic stability program actuation signal and determine if any electronic stability program events have occurred within a predetermined time period, read an electronic stability program switch signal and determine if an electronic stability program switch is turned off, read a G-sensor and vehicle speed sensor and determine if the vehicle is on an incline with low vehicle speed, and determine driving conditions based on one or more of ambient temperature, windshield wiper usage, autostick usage, electronic stability program, vehicle incline and speed, and combinations thereof.

In yet another exemplary embodiment of the present disclosure, an all-wheel drive vehicle configured to automatically lock and unlock a front axle disconnect mechanism responsive to driving conditions includes a front drive axle connected to a front axle differential through a front axle disconnect mechanism, a front drive shaft connected to the front axle differential and to a transfer case, a transmission connected to the transfer case, a plurality of sensors distributed throughout the vehicle, and a control module connected to the plurality of sensors, the control module is configured to determine driving conditions based upon readings from the plurality of sensors and to automatically lock and unlock the front axle disconnect mechanism responsive to driving conditions. Optionally, the control module is further configured to track the number of times the front axle disconnect mechanism is locked and unlocked per key cycle, and lock the front axle disconnect mechanism until a next key cycle if the number of times exceeds a threshold. The driving conditions can include low outside temperature, rainy conditions, autostick mode, electronic stability program events, electronic stability program off, vehicle incline and speed, and combinations thereof. The control module is further configured to read ambient temperature from a temperature sensor of the one or more sensors and compare to a temperature threshold, read windshield wiper sense and determine if windshield wipers have been actuated within a predetermined time period, read autostick sense and determine if a shifter is in autostick mode, read an electronic stability program actuation signal and determine if any electronic stability program events have occurred within a predetermined time period, read an electronic stability program switch signal and determine if an electronic stability program switch is turned off, read a G-sensor and vehicle speed sensor and determine if the vehicle is on an incline road surface with a low vehicle speed, and determine driving conditions based on one or more of ambient temperature, windshield wiper usage, autostick usage, electronic stability program, vehicle incline and speed, and combinations thereof.

BRIEF DESCRIPTION OF THE DRAWINGS

The present disclosure is illustrated and described herein with reference to the various drawings, in which like reference numbers denote like system components and/or method steps, respectively, and in which.

DETAILED DESCRIPTION OF THE DISCLOSURE

In various exemplary embodiments, the present disclosure provides methods and a system to automatically lock and unlock a front axle disconnect mechanism in an AWD system to reduce parasitic losses and increase fuel efficiency. The present disclosure includes a control algorithm which automatically determines whether the FAD should lock or unlock responsive to various sensor readings throughout the vehicle. The sensor readings relate to the driving conditions. Advantageously, the present disclosure automatically decides the best mode for optimum fuel economy while safely responding to driving conditions, and therefore removes the requirement for a driver to select the operating mode.

Figure 1:
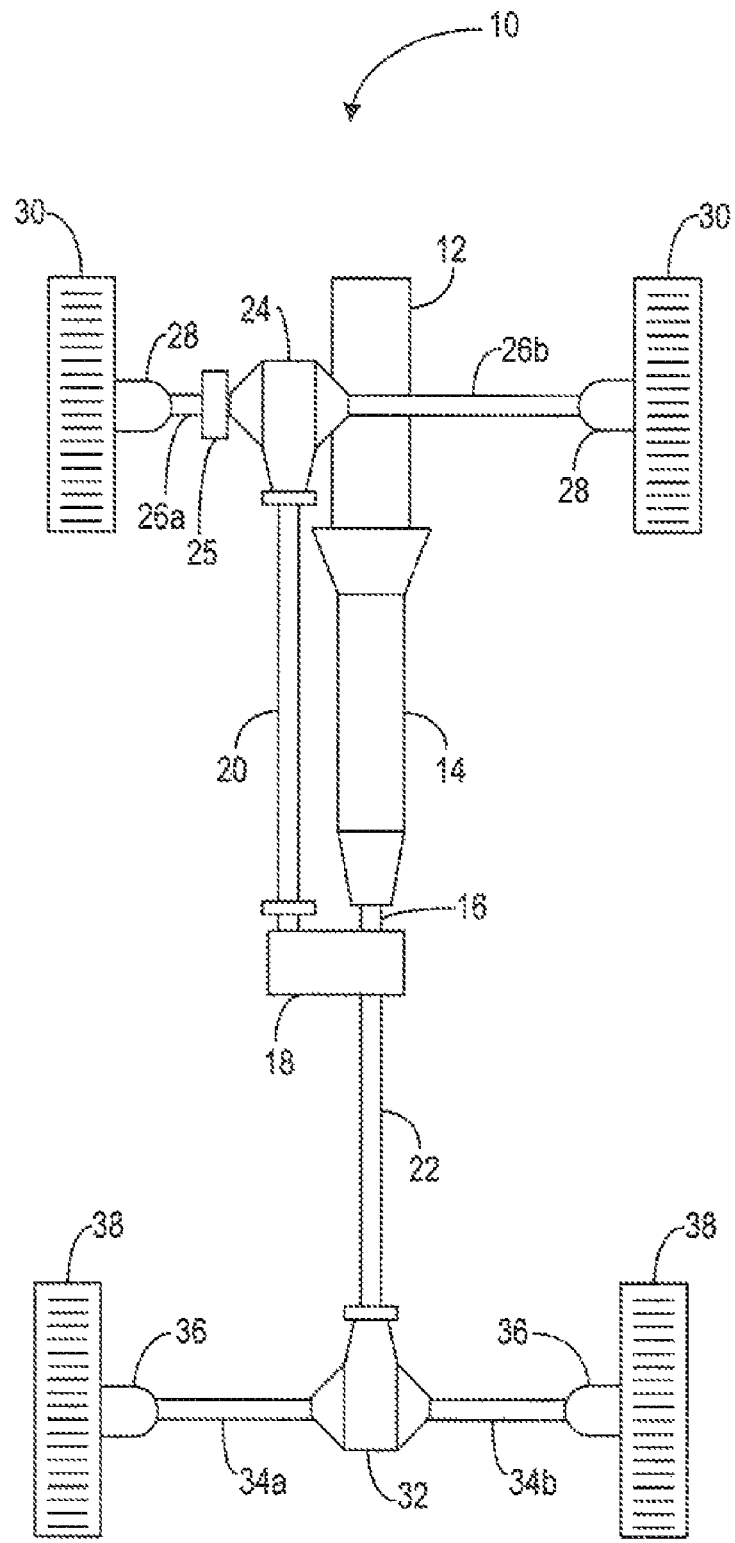
FIG. 1 is a diagram of a drive system according to an exemplary embodiment of the present disclosure.

Referring to FIG. 1, a drive system 10 for an AWD-capable vehicle, according to an exemplary embodiment of the present disclosure, includes an engine 12 connected to a transmission 14. The engine 12 is a prime mover, such as an internal combustion engine. The transmission 14 connects to the engine 12 through a shaft, and is configured to provide a speed-power conversion. The transmission 14 includes an output shaft 16 which connects to a transfer case 18.

The transfer case 18 is included in 4W drive and AWD systems, and is also referred to as a "transfer gearcase", "transfer gearbox" or just "transfer box". The transfer case 18 is connected to the transmission 14 and to a front drive shaft 20 and a rear drive shaft 22. The front drive shaft 20 is connected to a front axle differential 24 which in turn is connected to front drive axles 26a and 26b. The front drive axles 26a and 26b connect to wheel hubs 28 which are in turn connected to front wheels 30.

The rear drive shaft 22 is connected to a rear axle differential 32 which in turn is connected to rear drive axles 34a and 34b. The rear drive axles 34a and 34b connect to wheel hubs 36 which are in turn connected to rear wheels 38. The front and rear axle differentials 24 and 32 allow the drive axles 26a, 26b, 34a, and 34b to each receive power, and for the wheels 30 and 38 to turn at different speeds.

The transfer case 18 receives power from the transmission 14 and sends it to both the front and rear drive axles 26a, 26b, 34a, and 34b. As described herein on AWD-capable vehicles, the transfer case 18 can be manually controlled by the driver. For example, the driver can put the transfer case 18 into either "two wheel drive" or "four wheel drive" mode. This can be accomplished through a shifter, similar to that in a manual transmission. Alternatively, this can be electronically operated by a switch. The transfer case 18 can contain one or more sets of gears which are engaged with the shifter or electronic switch. For example, the gears can be engaged with the same shifter or switch that selects 2WD or 4WD operation. The gears slow down the vehicle and increase the torque available at the axles.

In an exemplary embodiment of the present disclosure, a front axle disconnect mechanism 25 is configured to automatically lock and unlock the front drive axle 26a from the front axle differential 24. Alternatively, the wheel hubs 28 can include a disconnect device, such as a locking hub or the like, which is configured to lock the front wheels 30 to the front drive axle 26a and 26b. Conventionally, the front axle disconnect mechanism 25 and/or locking hub can be manually locked and unlocked responsive to the driver selecting 4W drive or 2W drive. In the present disclosure, the front axle disconnect mechanism 25 or locking hubs are automatically locked and unlocked responsive to various driving conditions. In an exemplary embodiment, the present disclosure utilizes a control algorithm based upon inputs from multiple existing vehicle sensors to control locking and unlocking of the front axle disconnect mechanism 25.

Figure 2:
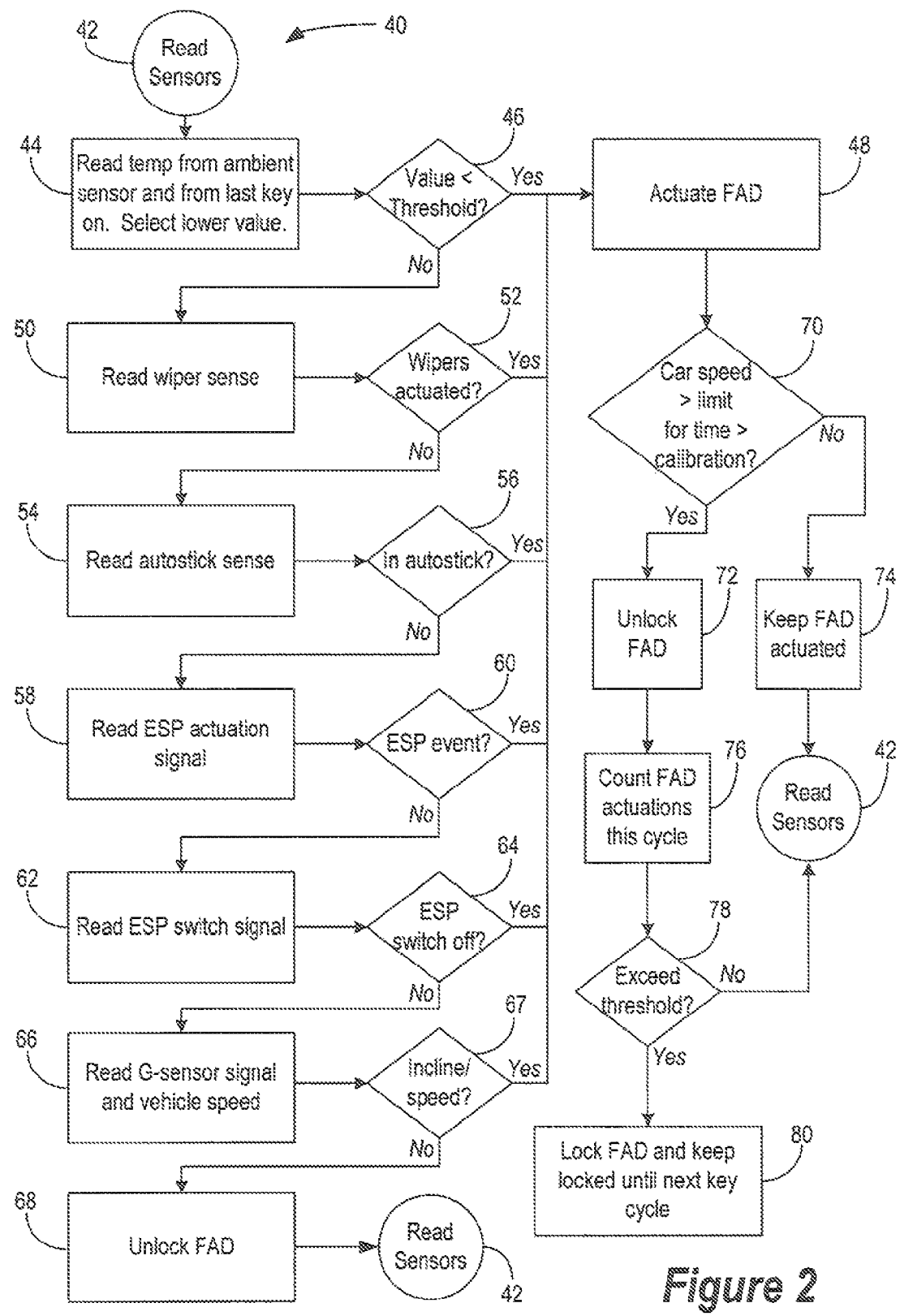
FIG. 2 is a flowchart of an automatic front axle disconnect method according to an exemplary embodiment of the present disclosure.

Referring to FIG. 2, a flowchart illustrates a front axle disconnect (FAD) lock/unlock control algorithm 40 according to an exemplary embodiment of the present disclosure. The control algorithm 40 begins with reading multiple sensors in a vehicle (step 42). The vehicle can include multiple sensors configured to communicate status and other information related to the vehicle's operation. For example, the vehicle can include an ambient temperature sensor, a windshield wiper state sensor, an autostick sensor, an Electronic Stability Program (ESP) state sensor, an ESP switch signal, a G-sensor to determine vehicle incline angle, and the like. The sensors are configured to notify the control algorithm 40 of the present driving conditions to determine the state of the FAD.

The control algorithm 40 reads temperature from an ambient sensor and from the last key on, and selects the lower value (step 44). The temperature value from step 44 allows the control algorithm 40 to determine the ambient outside temperature. This value is checked against a threshold temperature value (step 46). If the temperature from step 44 is lower than the threshold temperature value, then the FAD is actuated (step 48). This corresponds to driving the vehicle in cold conditions where it is advantageous to engage AWD, and hence lock the FAD.

If the temperature from step 44 is not lower than the threshold temperature value, then the control algorithm checks the wiper sense (step 50). The wiper sense provides a notification of whether the windshield wipers are active or when the last time the wipers were active, indicating the presence of rainy driving conditions. The wiper sense is checked to determine if the wipers have been actuated a minimum number of cycles within a predetermined time period (step 52). If the wipers have been actuated within the predetermined time period, then the FAD is actuated (step 48).

If the wipers have not been actuated within the predetermined time period, then the control algorithm 40 reads the autostick sense (step 54). Autostick provides a manual selection of gears with an automatic transmission, and is typically used for towing loads, driving in snow, and the like. The autostick sense is checked to see if the shifter is operating in the autostick mode (step 56). If the autostick mode is on, then the FAD is actuated (step 48).

If the autostick mode is off, the control algorithm 40 reads the ESP actuation signal (step 58). The ESP is designed to improve a vehicle's handling, particularly at the limits where the driver might lose control of the vehicle. The ESP operates by comparing the driver's intended direction in steering and braking inputs, to the vehicle's response, via lateral acceleration, rotation and individual wheel speeds. The ESP then brakes individual front or rear wheels and/or reduces excess engine power as needed to help correct understeer or oversteer. The ESP also integrates all-speed traction control, which senses drive-wheel slip under acceleration and individually brakes the slipping wheel or wheels, and/or reduces excess engine power, until control is regained.

The control algorithm 40 checks to determine if an ESP event has occurred within a predetermined time (step 60). This is indicative to driving conditions where the wheels are slipping, and where accordingly it is advantageous to utilize AWD. If an ESP event occurred within the predetermined time, then the FAD is actuated (step 48). If not, the control algorithm 40 reads the ESP switch signal (step 62).

The ESP switch signal determines if the ESP is engaged or disengaged. For example, the ESP can be turned off by a driver, such as during icy conditions. The control algorithm 40 checks to see if the ESP switch is off (step 64). If the ESP switch is off, then the FAD is actuated (step 48). If the ESP switch is on, then the G-sensor signal and vehicle speed are read (step 66).

The G-sensor provides a measure of vehicle incline, and can be used to determine if the vehicle is driving in steep conditions. The combination of vehicle incline and speed can be indicative of the vehicle driving on an inclined road surface at a low vehicle speed where have AWD is advantageous. If the vehicle speed is below a threshold miles per hour and the incline angle is greater than a threshold degree (step 67), then the FAD is actuated (step 48).

Finally, if the conditions in steps 46, 52, 56, 60, 64, and 67 are not met, then the FAD is unlocked (step 68), and the control algorithm 40 returns to reading the sensors in step 42. The activities in steps 42 through 67 correspond to determining the driving conditions and determining whether the FAD should be actuated, locking the FAD to enable AWD. Those of ordinary skill in the art will recognize that the control algorithm 40 can include additional driving conditions or be based on a subset of one or more of the driving conditions described herein. The control algorithm 40 automatically selects the best mode of the FAD to optimize fuel economy while being safely responsive to driving conditions. Advantageously, this reduces driver distraction by automatically selecting the best operating mode. Additionally, this can reduce complexity in the vehicle by removing the AWD selection equipment, e.g., switch and associated wiring.

Once the FAD is actuated in step 48, the control algorithm 40 waits until the vehicle speed exceeds a limit for a time period greater than a calibration value (step 70). This provides a threshold to determine whether the FAD should be unlocked. For example, exceeding a speed for a certain time period shows improved driving conditions such that AWD is no longer needed. If the conditions in step 70 are met, the FAD is unlocked (step 72). If not, the FAD is kept actuated (step 74), and the control algorithm 40 returns back to read the sensors in step 42.

After unlocking the FAD in step 72, the control algorithm 40 counts the number of FAD actuations for this key cycle (step 76). The number of FAD actuations is checked against a threshold (step 78), and if the number exceeds the threshold, then the FAD is locked and kept locked until the next key cycle (step 80). If the number does not exceed the threshold, then the control algorithm 40 returns to step 42 to read the sensors. Steps 76 through 80 are included to ensure the number of FAD actuations is kept low for each key cycle to reduce wear on the parts.

Figure 3:
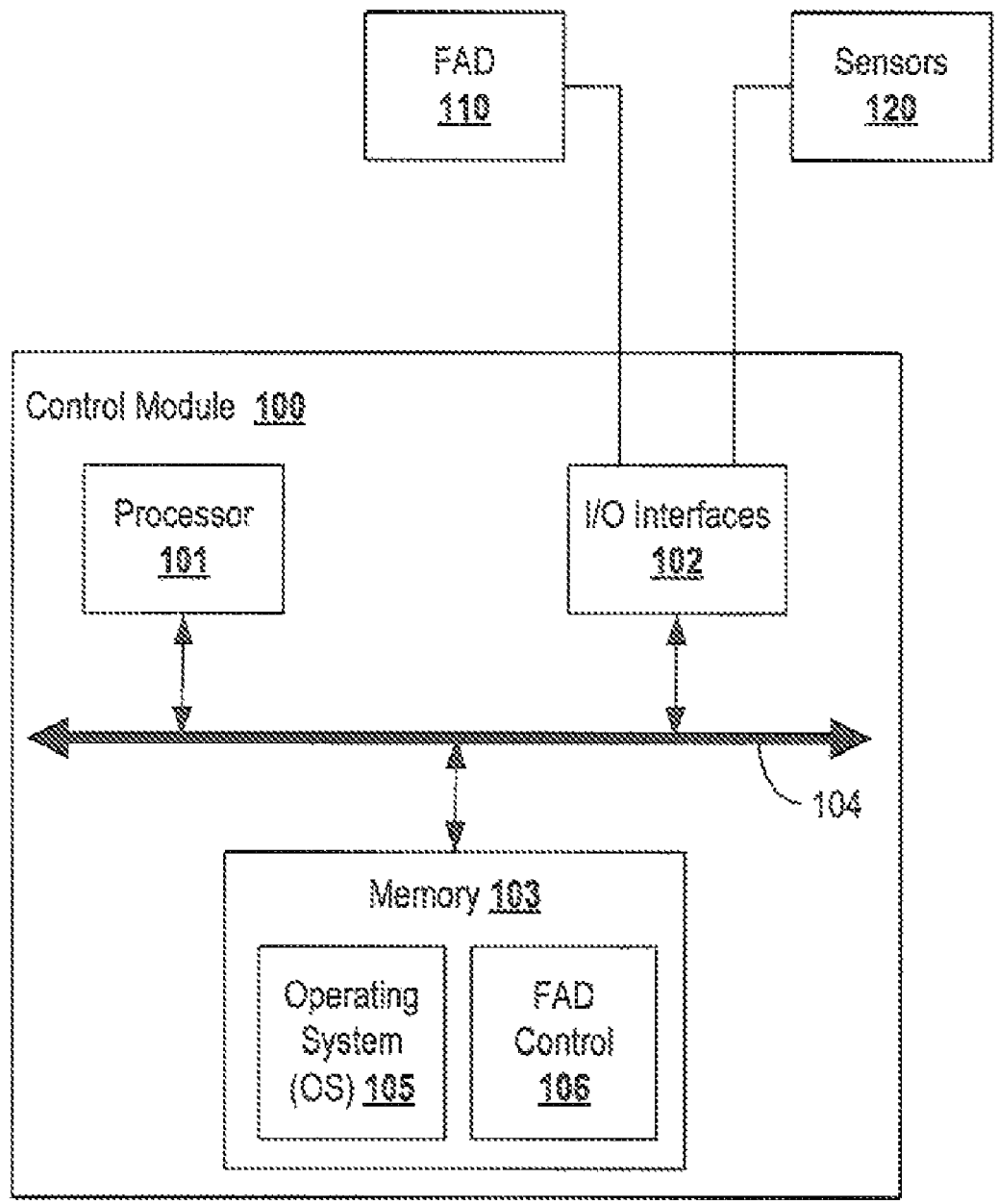
FIG. 3 is a block diagram of a controller configured to operate the flowchart of FIG. 2 according to an exemplary embodiment of the present disclosure.

Referring to FIG. 3, a control module 100 is illustrated according to an exemplary embodiment of the present disclosure. The control module 100 is configured to automatically lock and unlock a FAD 110 responsive to driving conditions. The driving conditions are determined responsive to input data from multiple sensors 120 distributed throughout a vehicle. For example, the control module 100 can be configured to operate the control algorithm 40 described herein in FIG. 2.

In one exemplary embodiment, the control module 100 is located in the vehicle, and is configured to perform the control of the FAD described herein in addition to performing control functions on the transfer case 18. Alternatively, the control module 100 can be an Engine Control Module (ECM) or Powertrain Control Unit/Module (PCU, PCM) if it controls both an engine and a transmission.

The control module 100 can be a digital computer that, in terms of hardware architecture, generally includes a processor 101, input/output (I/O) interfaces 102, and memory 103. The components (101, 102, and 103) are communicatively coupled via a local interface 104. The local interface 104 can be, for example, one or more buses or other wired or wireless connections, as is known in the art. The local interface 104 can have additional elements, which are omitted for simplicity, such as controllers, buffers (caches), drivers, repeaters, and receivers, among many others, to enable communications. Further, the local interface 104 can include address, control, and/or data connections to enable appropriate communications among the components described herein. The components (101, 102, and 103) can be packaged in a single microchip or as separate devices connected through a circuit board or the like.

The processor 101 is a hardware device for executing software instructions. The processor 101 can be any custom made or commercially available processor, a central processing unit (CPU), an auxiliary processor among several processors associated with the control unit 100, a semiconductor-based microprocessor (in the form of a microchip or chip set), a microcontroller, or generally any device for executing software instructions. When the control module 100 is in operation, the processor 101 is configured to execute software stored within the memory 103, to communicate data to and from the memory 103, and to generally control operations of the control module 100 pursuant to the software instructions.

The I/O interfaces 102 are used to receive input from and/or for providing system output to one or more devices or components. I/O interfaces 102 can include, for example, a serial port, a parallel port, a small computer system interface (SCSI), a Controller Area Network bus (CANbus), a universal serial bus (USB) interface, and any other connection type as is known in the art. The I/O interfaces 102 are communicatively coupled to the processor 101 and memory 103 through the local interface 104 providing communication to/from the control module 100 and various components and sensors 120 in the vehicle.

The memory 103 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 103 can incorporate electronic, magnetic, optical, and/or other types of storage media. Note that the memory 103 can have a distributed architecture, where various components are situated remotely from one another, but can be accessed by the processor 101.

The software in memory 103 can include one or more software programs, each of which includes an ordered listing of executable instructions for implementing logical functions. In the example of FIG. 3, the software in the memory 103 includes a suitable operating system (O/S) 105 and a FAD control algorithm 106. The operating system 105 essentially controls the execution of other computer programs, such as the FAD control algorithm 106 and other functions related to various aspects of a vehicle's operation, and provides scheduling, input-output control to/from the I/O interfaces 102, file and data management, memory management, and communication control and related services.

In an exemplary embodiment of the present disclosure, the I/O interfaces 102 are connected to FAD 110 and multiple sensors 120 distributed throughout the vehicle. As described herein, the FAD 110 is configured to lock and unlock the front axle responsive to 2W or 4W operation. The multiple sensors 120 are configured to monitor various aspects of the vehicle's operation as well as the current driving conditions. For example, the sensors 120 can include an ambient temperature sensor, a windshield wiper state sensor, an autostick sensor, an Electronic Stability Program (ESP) state sensor, an ESP switch signal, and the like.

The control module 100 is configured to data relating to the outside temperature, whether the windshield wipers are or have been used a minimum number of cycles, whether autostick is enabled, whether any ESP events have occurred, whether ESP is switched off, whether the vehicle is on an incline with a vehicle speed below a specified minimum speed, and the like. Through these sensor readings, the control module 100 can implement an algorithm, such as control algorithm 40, to determine whether the FAD 110 should be locked or unlocked. Additionally, the memory 103 can store data, such as the last key on temperature, the last time the wipers were used, the number of recent ESP events, and the like.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are intended to be covered by the following claims.

What is claimed is:

1. A front axle lock and unlock method for an all-wheel drive vehicle, comprising:
determining driving conditions responsive to readings from one or more sensors;
checking whether the driving conditions require all-wheel drive;
actuating a front axle disconnect responsive to whether all-wheel drive is required;
monitoring driving speed over time;
unlocking the front axle disconnect responsive to the driving speed over time;
repeating the determining, checking, actuating, monitoring, and unlocking steps; and
checking the number of actuations of the front axle disconnect since key on; and
locking the front axle disconnect until a next key cycle if the number of actuations exceeds a threshold.

2. The front axle lock and unlock method of claim 1, wherein the driving conditions comprise low outside temperature, rainy conditions, manual selection mode for automatic transmission gears, electronic stability program events, electronic stability program off, vehicle on inclined road surface at a low vehicle speed, and combinations thereof.

3. The front axle lock and unlock method of claim 1, wherein the checking step further comprises:
reading ambient temperature from a sensor and comparing to a threshold;
reading windshield wiper sense and determining if windshield wipers have been actuated a minimum number of wiper cycles within a predetermined time period;
reading a transmission mode sensor to determine if a shifter is in manual selection mode for automatic transmission gears;
reading an electronic stability program actuation signal and determining if any electronic stability program events have occurred within a predetermined time period;
reading an electronic stability program switch signal and determining if an electronic stability program switch is turned off; and
reading a G-sensor and vehicle speed sensor and determining if the vehicle is on an inclined road surface at a low vehicle speed.

4. The front axle lock and unlock method of claim 1, wherein the all-wheel drive vehicle comprises a transfer case; and wherein the transfer case comprises a control module configured to receive reading from the one or more sensors and perform the front axle lock and unlock method.

5. A control module configured to automatically lock and unlock a front axle disconnect mechanism for an all-wheel drive vehicle responsive to driving conditions, comprising:
input and output interfaces connected to a front axle disconnect mechanism and one or more sensors distributed throughout the all-wheel drive vehicle; and
a processor connected to the input and output interfaces and memory, wherein the processor is configured to:
determine driving conditions responsive to readings received from the input and output interfaces from the one or more sensors;
monitor driving conditions to determine whether all-wheel drive is required;
actuate the front axle disconnect mechanism to lock and unlock a front axle responsive to whether all-wheel drive is required based on the driving conditions;
track the number of front axle disconnect mechanism actuations per key cycle; and
lock the front axle disconnect mechanism until a next key cycle if the number of actuations exceeds a threshold.

6. The control module of claim 5, wherein the driving conditions requiring all-wheel drive comprise low outside temperature, rainy conditions, manual selection mode for automatic transmission gears, electronic stability program events, electronic stability program off, vehicle on an incline at low vehicle speeds, and combinations thereof.

7. The control module of claim 5, wherein the processor is further configured to:
   read ambient temperature from a temperature sensor of the one or more sensors and compare to a temperature threshold;
   read windshield wiper sense and determine if windshield wipers have been actuated within a predetermined time period;
   read a transmission mode sensor to determine if a shifter is in manual selection mode for automatic transmission gears;
   read an electronic stability program actuation signal and determine if any electronic stability program events have occurred within a predetermined time period;
   read an electronic stability program switch signal and determine if an electronic stability program switch is turned off;
   read a G-sensor and vehicle speed sensor and determine if the vehicle is on an incline with low vehicle speed; and
   determine driving conditions based on one or more of ambient temperature, windshield wiper usage, usage of manual selection of automatic transmission gears, electronic stability program, vehicle incline and speed, and combinations thereof.

8. The control module of claim 5, wherein the control module is located inside the all-wheel drive vehicle.

9. An all-wheel drive vehicle configured to automatically lock and unlock a front axle disconnect mechanism responsive to driving conditions, comprising:
   a front drive axle connected to a front axle differential through a front axle disconnect mechanism;
   a front drive shaft connected to the front axle differential and to a transfer case;
   a transmission connected to the transfer case;
   a plurality of sensors distributed throughout the vehicle; and
   a control module connected to the plurality of sensors, the control module is configured to determine driving conditions based upon readings from the plurality of sensors and to automatically lock and unlock the front axle disconnect mechanism responsive to driving conditions, and to track the number of times the front axle disconnect mechanism is locked and unlocked per key cycle, and lock the front axle disconnect mechanism until a next key cycle if the number of times exceeds a threshold.

10. The all-wheel drive vehicle of claim 9, wherein the driving conditions comprise low outside temperature, rainy conditions, manual selection mode for automatic transmission gears, electronic stability program events, electronic stability program off, vehicle incline and speed, and combinations thereof.

11. The all-wheel drive vehicle of claim 9, wherein the control module is further configured to:
   read ambient temperature from a temperature sensor of the one or more sensors and compare to a temperature threshold;
   read windshield wiper sense and determine if windshield wipers have been actuated within a predetermined time period;
   read a transmission mode sensor to determine if a shifter is in manual selection mode for automatic transmission gears;
   read an electronic stability program actuation signal and determine if any electronic stability program events have occurred within a predetermined time period;
   read an electronic stability program switch signal and determine if an electronic stability program switch is turned off;
   read a G-sensor and vehicle speed sensor and determine if the vehicle is on an incline road surface with a low vehicle speed; and
   determine driving conditions based on one or more of ambient temperature, windshield wiper usage, usage of manual selection of automatic transmission pears, electronic stability program, vehicle incline and speed, and combinations thereof.

* * * * *